(12) United States Patent  (10) Patent No.: US 6,195,550 B1
Sollee et al.  (45) Date of Patent: Feb. 27, 2001

(54) METHOD FOR REDUCING MESSAGING FOR INTER-VLR LOCATION UPDATES

(75) Inventors: Patrick N. Sollee, Richardson; Steve Kolski; Mike Bishop, both of Plano, all of TX (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/223,453

(22) Filed: Dec. 30, 1998

(51) Int. Cl.[7] .................................................. H04Q 7/20
(52) U.S. Cl. ............................................. 455/432; 455/433
(58) Field of Search ................................... 455/432, 456, 455/433

(56) References Cited

U.S. PATENT DOCUMENTS 5,583,916 * 12/1996 Maenpaa ............................... 379/58
5,675,628 * 10/1997 Hokkanen .............................. 379/58
5,713,073 * 1/1998 Warsta ................................. 455/56.1
5,887,256 * 3/1999 Lu et al. .............................. 455/426

FOREIGN PATENT DOCUMENTS

WO96/04759 * 2/1996 (WO).

* cited by examiner

Primary Examiner—Nguyen Vo
Assistant Examiner—N. Mehrpour
(74) Attorney, Agent, or Firm—Carr & Storm, L. L. P.

(57) ABSTRACT

A method for messaging during Inter-VLR location updates wherein a mobile station (MS) sends to a Visitor Location Register (VLR) a Location Update message having a Temporary Mobile Subscriber Identity (TMSI) number embedded therein. The VLR records the TMSI and sends to the MS a Location Update Accept message void of a TMSI number.

17 Claims, 3 Drawing Sheets

METHOD FOR REDUCING MESSAGING FOR INTER-VLR LOCATION UPDATES

TECHNICAL FIELD

The invention relates generally to wireless communications and, more particularly, to a method for reducing A-interface messaging for Inter-VLR location updates made across GSM wireless networks.

BACKGROUND

In Global Systems for Mobile Communication (GSM) wireless communication networks, subscribers frequently move between Location Area Codes (LAC's), one or many of which is served by a Visitor Location Register (VLR) of a network. As subscribers move between LAC's which are served by different VLR's, Inter-VLR location updates are performed to maintain the current location of the subscriber in the network. To perform Inter-VLR location updates as a subscriber enters a new LAC served by different VLR's, the subscriber is assigned a Temporary Mobile Subscriber Identity (TMSI) number so that exposure of the subscriber's International Mobile Subscriber Identity (IMSI) number is minimized. This helps to reduce exposure of the IMSI to possible fraudulent use.

During Inter-VLR location updates, TMSI's are re-assigned. GSM specifications recommend that the assignment of new TMSI's should be done using a ciphered channel in order to reduce the chance of interception. Therefore, in order to transmit a subscriber's new TMSI, the channel must first be ciphered using Base Station Subsystem Mobile Application Part (BSSMAP) Ciphering procedures. This requires that the network send a BSSMAP Cipher Mode Command message to a Base Station Subsystem (BSS), and then wait for a Cipher Mode Complete message before the TMSI can be delivered. Upon receipt of Cipher Mode Complete message, the network sends a new TMSI within a DTAP Location Update Accept message. The new TMSI is stored in a subscriber's mobile station which then confirms its receipt by sending a DTAP TMSI Reallocation Complete message.

Additionally, upon initial receipt of a Location Update Request message during Inter-VLR location updates, the TMSI stored by the mobile station will be unknown in the new VLR since the TMSI was allocated in a previous VLR. This requires that the network obtain the subscriber's IMSI from either the previous VLR or the mobile station.

As the number of cellular subscribers in a metropolitan area increases, the number of switching nodes in the area increases. This results in a higher rate of mobility between switching nodes and in the number of Inter-VLR location updates that must be performed. An increase in the rate of Inter-VLR location updates results in an increase in quantity of network work-time that must be expended handling subscriber mobility events such as IMSI retrieval, ciphering, and TMSI reallocation. This increase in the work required to handle mobility results in a decrease in the number of subscribers the network can support.

One method that has been proposed to reduce Inter-VLR location update work-time has been to use the concept of a "SuperCharger" to reduce messages sent between a VLR and an HLR. SuperCharger is described in a Patent Application entitled "Distributed Subscriber Data Manager in Wireless Networks from a Remote Perspective" filed on Aug. 30, 1996, and assigned Ser. No. 08/697,854, a continuation of same filed on May 29, 1997, and assigned Ser. No. 08/864,927, and in a Patent Application entitled "Distributed Subscriber Data Manager in Wireless Networks from a Central Perspective" filed on Aug. 30, 1996, and assigned Ser. No. 08/697,854, and a continuation of same filed on May 29, 1997, and assigned Ser. No. 08/864,926. The SuperCharger, however, does not reduce work-time that must be spent handling subscriber mobility events such as IMSI retrieval, ciphering, and TMSI reallocation messages sent between the network and the BSS, i.e., on an A-interface.

Accordingly, a continuing search has been directed to the development of methods for performing Inter-VLR location updates which do not require significant network work-time, particularly on the A-interface of a network and, therefore, which permit networks to support a greater number of subscribers than is possible using conventional methods.

SUMMARY

The present invention, accordingly, provides a method whereby the TMSI of a mobile station is reused, and new TMSI's are not reallocated every time a mobile station performs an Inter-VLR location update. By reusing the TMSI, IMSI retrieval, ciphering, and TMSI reallocation messaging events are minimized, and the real-time performance of Inter-VLR location updates is improved.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
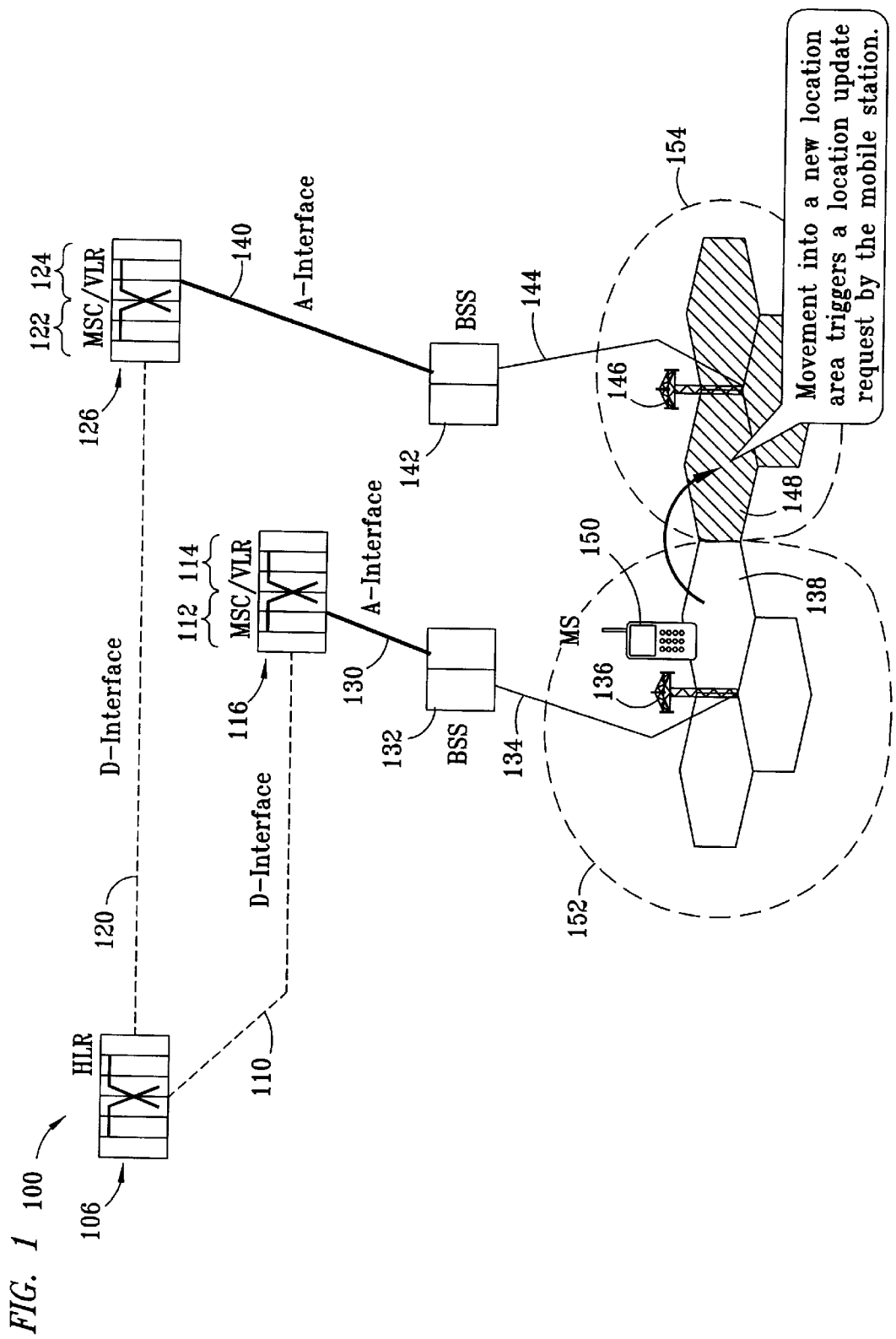
FIG. 1 is a high-level conceptual block diagram illustrating a wireless communications network.

In the discussion of the FIGURES the same reference numerals will be used throughout to refer to the same or similar components. In the interest of conciseness, various other components known to the art, such as Visitor Location Registers (VLR's), Mobility Switch Centers (MSC's), and the like, necessary for the operation of the wireless communication networks, have not been discussed in detail.

Referring to FIG. 1 of the drawings, the reference numeral 100 generally designates a portion of a wireless communication network embodying features of the present invention. The system 100 includes a Home Location Register (HLR) 106. The HLR 106 is configured for performing a number of well-known functions, such as recording the VLR currently serving a subscriber, storing subscriber information indicating services to which a subscriber is entitled, such as Call Waiting, Caller ID, and the like.

The HLR 106 is connected via a first "D-interface" 110 to at least one first Mobility Switch Center (MSC) 112 and at least one first Visitor Location Register (VLR) 114, commonly co-located with the first MSC 112, and collectively referred to as an MSC/VLR 116. The HLR 106 is further connected via a second "D-interface" 120 to at least one second MSC 122 and at least one second VLR 124, commonly co-located with the second MSC 122, and collectively referred to as an MSC/VLR 126.

The first MSC/VLR 116 is connected via at least one first "A-interface" 130 to at least one first Base Station Subsystem (BSS) 132. The first BSS 132 contains at least one antenna tower 136 located for wirelessly interfacing with at least one mobile station (MS) 150 such as a cellular phone, a Personal Communication System (PCS) phone, or the like, located in at least a cell 138, contained within a Location Area Code (LAC) 152, and serviced by the VLR 114. Similarly, the second MSC/VLR 126 is connected via at least one second "A-interface" 140 to at least one second BSS 142. The second BSS 142 is connected to at least one antenna tower 146 located for wirelessly interfacing with the MS 150 when it is located in at least a cell 148, contained within a LAC 154, and serviced by the VLR 124.

The MS 150 also includes a memory card (not shown) which stores a Temporary Mobile Subscriber Identity (TMSI) number which is unique between the at least one VLR 114 and the at least one VLR 124. Such uniqueness of the TMSI between VLR's within a common PLMN may be achieved using algorithms which are well-known and will, therefore, not be discussed further. If the MS 150 does not have a TMSI, then a new TMSI is allocated using message event sequences which are well-known in the art, rather than the event sequences of the present invention described below. The system 100 described above is considered to be well-known in the art and will, therefore, not be described in further detail herein.

Each MSC/VLR 116 and 126 contains a set of unique LAC's, including the LAC's 152 and 154, respectively, each of which contain at least the cells 138 and 148, respectively. The antennas 136 and 146 transmit the LAC value to all MS's 150 located in the respective cells 138 and 148. Upon receipt of a transmitted LAC, the MS 150 compares the transmitted LAC against a LAC stored in the MS 150. Equivalence between the transmitted LAC and the stored LAC indicates that the LAC in which the MS 150 is located has not changed and, as a consequence, no action is required by the MS 150. For example, if the MS 150 located in the cell 138 of FIG. 1 had stored in its memory the LAC 152 for the cell 138 when it received a LAC transmitted from the antenna tower 136 of the cell 138, then a comparison of the stored and transmitted LAC's would indicate that the LAC has not changed, and no action would be required by the MS 150. However, if the MS 150 is relocated, as indicated by the arrow 160, to the cell 148, and then received a LAC transmitted from the antenna tower 146, a comparison of the stored LAC 152 and the transmitted LAC 154 would indicate that the LAC had changed. As a consequence, the MS 150 would initiate location update procedures to update the network with its new location. The network 100 determines that this is an Inter-VLR location update and that the HLR 106 should be notified of the change in serving VLR's 124. Conventional location update procedures, however, utilize messaging sequences which require significant network work-time and which reduce the ability of the network to serve subscribers.

Figure 2:
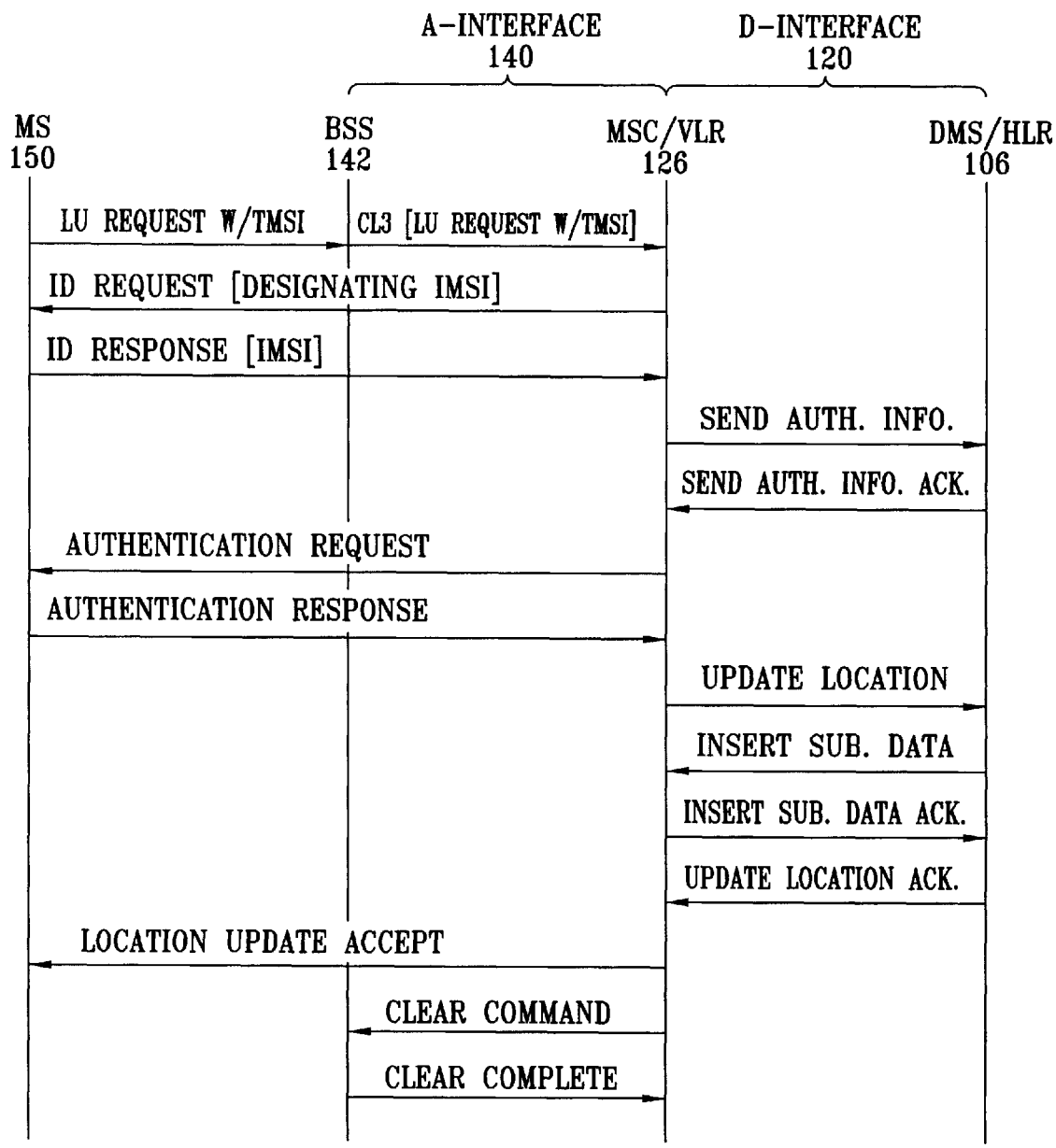
FIG. 2 depicts a preferred sequence of events which transpire during an Inter-VLR location update in accordance with the present invention.
Figure 3:
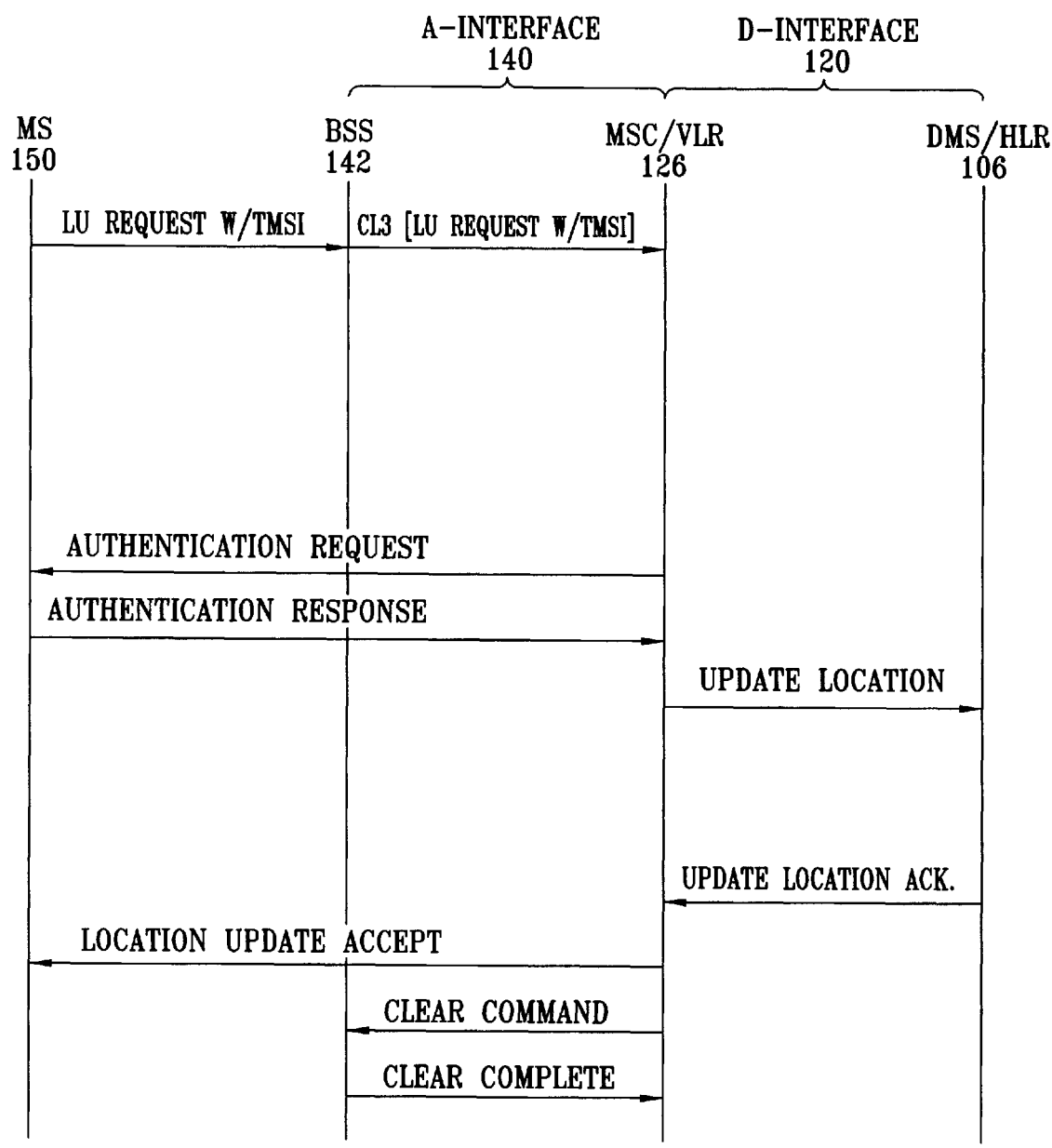
FIG. 3 depicts a preferred sequence of events which transpire during an Inter-VLR location update in accordance with the present invention when a D-interface is supplemented with SuperCharger.

FIGS. 2 and 3 depict preferred messaging sequences between subsystems according to principles of the present invention. It should be noted, however, that in alternative embodiments, the sequencing of events may differ. It should also be noted that in FIGS. 2 and 3, events occur timewise from the top of the diagram to the bottom of the diagram.

In FIG. 2, the MS 150 initiates a location update by transmitting to the antenna tower 146 a Location Update (LU) Request message, which includes the previous LAC and the TMSI of the MS 150. From the antenna tower 146, the LU Request message is transmitted to the BSS 142. In response, the BSS 142 transmits a Complete Layer 3 (CL3), with the LU Request message encapsulated therein, to the MSC/VLR 126. The MSC/VLR 126 then records in the second VLR 124 for subsequent use by the second VLR 124 the TMSI encapsulated within the LU Request and transmits an Identity (ID) Request through the BSS 142 back to the MS 150 requesting the subscriber's International Mobile Subscriber Identity (IMSI) number. The MS 150 responds by transmitting its subscriber's IMSI in an Identity Response message through the BSS 142 back to the MSC/VLR 126.

The MSC/VLR 126 then requests authentication information from the HLR 106 via a Mobile Application Part (MAP) Send Authentication Information message, which authentication information is specific to the MS 150. In response, the HLR 106 sends to the MSC/VLR 126 the requested authentication information within a Send Authentication Acknowledgment message. The MSC/VLR 126 then transmits through the BSS 142 to the MS 150 an Authentication Request message and awaits an Authentication Response message from the MS 150. Upon receipt of the Authentication Response message, the MSC/VLR 126 makes a determination of subscriber validity based on information contained within the Authentication Response message. If the MSC/VLR 126 determines that the authentication information provided by the HLR 106 and by the MS 150 differ, then the location update procedure terminates.

If the MSC/VLR 126 determines that the results provided by the HLR 106 and by the MS 150 are identical, then the MSC/VLR 126 sends an Update Location message to the HLR 106 so that the HLR 106 may update its records with the VLR currently serving the MS 150. The HLR 106 then transmits subscriber data about the MS 150 back to the MSC/VLR 126. The MSC/VLR 126 then sends an acknowledgment message back to the HLR 106, and the HLR 106 sends a message back to the MSC/VLR 126 acknowledging the earlier update location message sent by the MSC/VLR 126.

The second MSC/VLR 126 then sends an LU Accept message through the BSS 142 back to the MS 150 in response to the original LU Request sent earlier by the MS 150. In accordance with the present invention, the LU Accept message does not contain a new TMSI, and the second MSC/VLR 126 uses that same TMSI used by the first MSC/VLR 116. The MSC/VLR 126 then sends a Clear Command message to release the network connection used in the location update, and the BSS 142 responds with a Clear Complete message to indicate that the network connection has been released.

In further accordance with the present invention, in subsequent movement by the MS 150 between the VLR's 114 and 124, the MS 150 reuses the same TMSI.

By the practice of the present invention depicted in FIG. 2, an improved method is provided whereby an MS 150 reuses the same TMSI between MSC/VLR's when it initiates an Inter-VLR location update, thereby effectively reducing the quantity of network work-time which must be expended handling subscriber Inter-VLR mobility events on the A-interfaces 130 and 140, such as IMSI retrieval, ciphering, and TMSI reallocation, and the like, thereby improving the real-time performance of the network. As a result, the capacity of a network 100 to process Inter-VLR location updates is increased, thereby further resulting in an increase in the capacity of the network to service mobile stations such as the MS 150.

In FIG. 3, an alternate embodiment of the present invention is depicted in which the MS 150 initiates an location update as it moves from the cell 138 serviced by the MSC/VLR 116 to the cell 148 served by the MSC/VLR 126, each of which MSC/VLR's are Supercharged in accordance with Patent Application entitled "Distributed Subscriber Data Manager in Wireless Networks from a Remote Perspective" filed on Aug. 30, 1996, and assigned Ser. No. 08/697,854, a continuation of same filed on May 29, 1997, and assigned Ser. No. 08/864,927, and in a Patent Application entitled "Distributed Subscriber Data Manager in Wireless Networks from a Central Perspective" filed on Aug. 30, 1996, and assigned Ser. No. 08/697,854, and a continuation of same filed on May 29, 1997, and assigned Ser. No. 08/864,926, which patent applications are incorporated in their entirety by reference herein. The SuperCharger is effective for reducing the number of messages transmitted on the D-Interfaces 110 and 120, i.e., between the MSC/VLR's 116 and 126 and the HLR's 106 and 116, respectively, by maintaining in all VLR's in which the subscriber has roamed, subscriber data such as the subscriber's TMSI, IMSI, authentication information, and services subscribed to as such Caller ID, Call Waiting, and the like.

In accordance with the alternate embodiment of the present invention, when the MS 150 initiates a Location Update, it is not subsequently necessary for the Supercharged MSC/VLR 126 to request, or for the HLR 106 to transmit, the subscriber's IMSI, authentication information, or other subscriber data. The only messages that must be transmitted on the D-Interface 120 is an Update Location message transmitted from the MSC/VLR 126 to the HLR 106, and an Update Location Acknowledgment message transmitted from the HLR 106 to the MSC/VLR 126. Additionally, the ID Request/Response messages are not necessary. The sequence of message events shown in FIG. 3 is otherwise substantially identical to the sequence of events depicted in FIG. 2 and will, therefore, not be described in further detail.

In addition to the advantages described above with respect to the previous embodiment which reduced message traffic on the A-Interfaces 130 and 140, the alternate embodiment also reduces message traffic on the D-Interface 110 and 120 as well, thereby further increasing the capacity of the network 10 to serve mobile stations such as the MS 150 on the network.

It is understood that the foregoing description of events depicted in FIGS. 2 and 3 are equally applicable for the MS 150 when it relocates from the cell 148 served by the MSC/VLR 126 to the cell 138 served by the MSC/VLR 116.

It is understood that the present invention can take many forms and embodiments. Accordingly, several variations may be made in the foregoing without departing from the spirit or the scope of the invention. For example, a TMSI reuse counter, configurable by a user or the network, may be provided to limit the number of times which a TMSI may be reused at a any particular VLR or all VLR's. When a TMSI has then been used a predetermined number of times, the TMSI may be reallocated using conventional messaging sequences which are well-known in the art.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

What is claimed is:

1. A method for messaging during location updates comprising the steps performed by a second Visitor Location Register (VLR) of:

receiving a Location Update (LU) message from a mobile station (MS) moved within a network from a first Location Area Code (LAC) served by a first VLR to a second LAC served by the second VLR within the network, the LU message including a Temporary Mobile Subscriber Identity (TMSI) number embedded therein, which TMSI number was previously used to identify the MS to the first VLR;

recording the TMSI number;

encoding an LU Accept message which does not re-assign a new TMSI number, and is thereby void of a new TMSI number;

transmitting the LU Accept message to the MS; and re-using the TMSI number, previously used by the first VLR to identify the MS, to also identify the MS in subsequent communications with the MS.

2. The method of claim 1 further comprising determining whether the LU Accept message received by the MS indicates that the TMSI number used by the first VLR to identify the MS will be re-used by the second VLR to identify the MS; and upon determining that the TMSI number will be re-used, commencing communication between the MS and the second VLR.

3. The method of claim 1, further comprising the steps performed by the second VLR of:

sending an identification (ID) request message to the MS; and receiving from the MS an ID response comprising the International Mobile Subscriber Identity (IMSI) of the MS.

4. The method of claim 1 further comprising the steps of:

communicating an identification (ID) request message from the second VLR to the MS;

communicating an ID response from the MS to the second VLR, which ID response includes the International Mobile Subscriber Identity (IMSI) of the MS;

communicating from the second VLR to the Home Location Register (HLR) of the MS a request message for authentication information from the MS, which request message includes the IMSI of the MS;

receiving by the second VLR authentication information from the HLR;

communicating an authentication request from the second VLR to the MS; and receiving by the second VLR a response from the MS, the response including the requested authentication information.

5. The method of claim 1 further comprising the steps of:

communicating an identification (ID) request message from the second VLR to the MS;

communicating an ID response from the MS to the second VLR, which ID response includes the International Mobile Subscriber Identity (IMSI) of the MS;

communicating from the second VLR to the Home Location Register (HLR) of the MS a request message for authentication information from the MS, which authentication information includes the IMSI of the MS;

receiving by the second VLR authentication information from the HLR;

communicating from the second VLR an authentication request to the MS;

receiving by the second VLR from the MS a response having the requested authentication information;

upon receipt of the response having authentication information, determining whether the authentication information is correct;

upon a determination that the authentication information is correct, communicating to the HLR a message containing information to update the location of the MS stored in the HLR;

communicating subscriber data from the HLR to the second VLR;

communicating a message from the second VLR to the HLR acknowledging that the subscriber data has been received by the second VLR; and communicating a message from the HLR to the second VLR acknowledging that the location of the VLR has been updated.

6. The method of claim 1 further comprising the steps of:

entering the MS into the first VLR prior to the step of receiving;

storing subscriber data regarding the MS by the first VLR and maintaining said subscriber data regarding the MS subsequent to exit of the MS from the first VLR for re-use by the first VLR upon future re-entry of the MS to the first VLR;

exiting by the MS subsequent to the step of communicating between the MS and the second VLR;

re-entering the MS into the first VLR;

sending from the first VLR an authentication request to the MS;

receiving by the first VLR from the MS a response having the requested authentication information;

upon receipt of the response having authentication information, determining whether the authentication information is correct;

upon a determination that the authentication information is correct, sending to the HLR a message containing information to update the location of the MS stored in the HLR;

sending a message from the HLR to the second VLR acknowledging that the location of the VLR has been updated;

communicating an LU Accept message from the first VLR through an MSC to the MS re-using the TMSI number previously used by the first VLR and the second VLR to identify the MS.

7. The method of claim 1 wherein the second VLR is co-located with an MSC.

8. A method for messaging during location updates comprising the steps performed by a second Visitor Location Register (VLR) operatively associated with a second Mobility Switch Center (MSC) of:

receiving a Location Update (LU) message via the second MSC from a mobile station (MS) moved within a network from a first Location Area Code (LAC) served by a first MSC to a second LAC served by the second MSC within the network, the LU message including a Temporary Mobile Subscriber Identity (TMSI) number embedded therein, which TMSI number was previously used to identify the MS to a first VLR operatively associated with the first MSC;

recording the TMSI number in the second VLR;

encoding an LU Accept message which does not re-assign a new TMSI number, and is thereby void of a new TMSI number transmitting the LU Accept message via the second MSC to the MS; and re-using the TMSI number, previously used by the first VLR to identify the MS, to also identify the MS in subsequent communications with the MS.

9. The method of claim 8 further comprising determining whether the LU Accept message received by the MS indicates that the TMSI number used by the first VLR to identify the MS will be re-used by the second VLR to identify the MS; and upon determining that the TMSI number will be re-used, commencing communication between the MS and the second VLR.

10. The method of claim 8 wherein the step of receiving the LU message further comprises receiving the LU message from the MS via a Base Station Subsystem (BSS) and the second MSC; the step of transmitting the LU Accept message further comprises transmitting the LU Accept message via the second MSC and the BSS to the MS.

11. The method of claim 8 further comprising the steps performed by the second VLR of:

sending an identification (ID) request message via the second MSC to the MS; and receiving an ID response from the MS via the second MSC, the ID response including the International Mobile Subscriber Identity (IMSI) of the MS.

12. The method of claim 8 further comprising the steps of:

communicating an identification (ID) request message from the second MSC to the MS;

communicating an ID response from the MS to the second MSC, and communicating the ID response from the second MSC to the second VLR, which ID response includes the International Mobile Subscriber Identity (IMSI) of the MS;

communicating from the second VLR to the Home Location Register (HLR) of the MS a request message for authentication information from the MS, which request message includes the IMSI of the MS;

receiving by the second VLR authentication information from the HLR;

communicating an authentication request from the second VLR to the MS; and receiving by the second VLR a response from the MS, the response including the requested authentication information.

13. The method of claim 8 further comprising the steps performed by the second VLR of:

communicating an identification (ID) request message to the MS;

receiving an ID response from the MS, which ID response includes the International Mobile Subscriber Identity (IMSI) of the MS;

communicating to the Home Location Register (HLR) of the MS a request message for authentication information from the MS, which authentication information includes the IMSI of the MS;

receiving authentication information from the HLR;

communicating an authentication request to the MS;

receiving from the MS a response having the requested authentication information;

upon receipt of the response having authentication information, determining whether the authentication information is correct;

upon a determination that the authentication information is correct, communicating to the HLR a message containing information to update the location of the MS stored in the HLR;

receiving subscriber data from the HLR;

communicating a message to the HLR acknowledging that the subscriber data has been received by the second VLR; and receiving a message from the HLR acknowledging that the location of the VLR has been updated.

14. The method of claim 8 further comprising the steps of:

entering the MS into the first VLR prior to the step of receiving;

storing subscriber data regarding the MS by the first VLR and maintaining said subscriber data regarding the MS subsequent to exit of the MS from the first VLR for re-use by the first VLR upon future re-entry of the MS to the first VLR;

exiting by the MS subsequent to the step of communicating between the MS and the second MSC;

re-entering the MS into the first VLR;

sending from the first VLR an authentication request to the MS;

receiving by the first VLR from the MS a response having the requested authentication information;

upon receipt of the response having authentication information, determining whether the authentication information is correct;

upon a determination that the authentication information is correct, sending to the HLR a message containing information to update the location of the MS stored in the HLR;

sending a message from the HLR to the second VLR acknowledging that the location of the VLR has been updated;

communicating an LU Accept message from the first VLR through the MSC to the MS re-using the TMSI number previously used by the first VLR and the second VLR to identify the MS.

15. The method of claim 8 wherein the second VLR is co-located with the second MSC.

16. A mobile station (MS) configured for re-using a common TMSI number when moving within a network between a first VLR and a second VLR, the MS comprising:

code for communicating a Location Update (LU) message to the second VLR, the LU message including the common TMSI number embedded therein, which common TMSI number was previously used to identify the MS to the first VLR;

code for determining whether an LU Accept message received by the MS does not include a re-assigned new TMSI number; and code operative upon determining that the LU Accept message received by the MS does not include a re-assigned new TMSI number, for re-using the common TMSI number to identify the MS in subsequent communications to the second VLR.

17. A computer program product for re-using a common TMSI when a mobile station (MS) moves within a network from a first Visitor Location Register (VLR) to a second VLR, the computer program product having a medium with a computer program embodied thereon, the computer program comprising for use in the second VLR:

computer program code for storing in the second VLR a Temporary Mobile Subscriber Identity (TMSI) number embedded in an Location Update (LU) message, which TMSI number was previously used to identify the MS to the first VLR;

computer program code for generating an LU Accept message which does not re-assign a new TMSI number, and is thereby void of a new TMSI number, so that the TMSI number used by the first VLR to identify the MS will be re-used by the MS and the second VLR to identify the MS; and computer program code for communicating the LU Accept message from the second VLR to the MS; and computer program code for re-using the TMSI number, previously used by the first VLR to identify the MS, to also identify the MS in subsequent communications with the MS.

\* \* \* \* \*

UNITED STATES PATENT AND TRADEMARK OFFICE
CERTIFICATE OF CORRECTION

PATENT NO. : 6,195,550 B1
DATED : February 27, 2001
INVENTOR(S) : Sollee et al.

It is certified that error appears in the above-identified patent and that said Letters Patent is hereby corrected as shown below:

Column 8,
Line 9, after "comprising", insert -- the step of --

Signed and Sealed this

Twenty-second Day of January, 2002

*Attest:*

JAMES E. ROGAN
*Director of the United States Patent and Trademark Office*

*Attesting Officer*